(12) United States Patent
De Souza et al.

(10) Patent No.: US 6,524,453 B1
(45) Date of Patent: Feb. 25, 2003

(54) ELECTRODE ASSEMBLY

(75) Inventors: Mario De Souza, Medicine Hat (CA); Gabi Balan, Medicine Hat (CA)

(73) Assignee: FatPower Inc., Calgary (CA)

( * ) Notice: Subject to any disclaimer, the term of this patent is extended or adjusted under 35 U.S.C. 154(b) by 0 days.

(21) Appl. No.: 09/719,976

(22) PCT Filed: Jun. 29, 1999

(86) PCT No.: PCT/CA99/00590

§ 371 (c)(1),
(2), (4) Date: Dec. 18, 2000

(87) PCT Pub. No.: WO00/00671

PCT Pub. Date: Jan. 6, 2000

(30) Foreign Application Priority Data

Apr. 21, 1998 (CA) ............................................... 2269382

(51) Int. Cl.[7] ................................................. C25B 9/00
(52) U.S. Cl. ........................ 204/270; 204/269; 204/267; 204/276; 204/278; 204/278.5; 204/288; 204/288.6; 204/289
(58) Field of Search ................................ 204/242, 267, 204/269, 270, 276, 278, 278.5, 288, 288.6, 289

(56) References Cited

U.S. PATENT DOCUMENTS 5,087,344 A  2/1992  Wenske et al.
5,843,292 A  12/1998  Spiros
6,257,175 B1 * 7/2001  Mosher et al. ................. 123/3

FOREIGN PATENT DOCUMENTS

CA  2158068  9/1994

* cited by examiner

*Primary Examiner*—Bruce F. Bell

(57) ABSTRACT

The present invention is directed to an electrochemical apparatus comprising of an electrode assembly, an internal reservoir and an internal dryer. The internal dryer consists of a chamber filled with a multitude of balls to create mechanical obstacles removing moisture from gasses present inside, reducing the volume of accumulated gasses and acting as anti-splash for the electrolyte. The invention is also directed to an electrode assembly of monopolar electrodes for use in electrical apparatus. The bipolar electrode assembly comprises a pair of electrodes (12, 14), each of the electrodes having a plurality of electrode plates (16, 18) connected in series together. The electrode plates of each of the electrodes are connected to the next electrode plate in the series by a bridging member (20) contiguous with each of the interconnected electrode plates. The invention is also directed to an electrode for use in an electrode assembly. The electrode comprises a plurality of parallel spaced apart electrode plates connected in series to each other. Each of the electrode plates is connected to the next plate in the series by a bridging strap contiguous with each of the interconnected electrode plates.

19 Claims, 3 Drawing Sheets

ELECTRODE ASSEMBLY

FIELD OF THE INVENTION

The present invention is directed to an electrode assembly for use in electrical apparatus, in particular where the electrode assembly is a monopolar multi-plate electrode assembly with the individual electrode plates of the same polarity connected together by a bridging strap contiguous with each of the interconnected electrode plates.

BACKGROUND OF THE INVENTION

Various configurations of electrode assemblies are used in a number of different electrical apparatuses. Such electrical apparatus include multi-plate storage batteries, electrolysis and other electrochemical cells. Electrode assemblies may be either monopolar or bipolar depending upon the nature of the electrical apparatus and the required properties of the electrode assembly. Bipolar electrode assemblies have a plurality of individual plates with the opposite sides of each of the plates carrying the positive and negative charges. Another type of electrode assembly is a monopolar electrode assembly which has positive and negative electrode plates interleaved with one another. Monopolar electrode assemblies are commonly utilized in storage batteries and electrolysis and other electrochemical cells. Depending upon the application, the electrode plates may be separated by electrolyte, or the electrode assembly may be provided with electrically inert separators, such as glass mat separators, commonly utilized in lead acid storage batteries.

Monopolar electrode assemblies are provided with connectors on the outside plates of the assemblies for connecting the electrical apparatus into electrical circuits. Bipolar electrode assemblies require that in addition to the connectors on the outside plates of the assembly, the individual anodes or cathodes are charging the surfaces through the electrolyte. For monopolar assemblies, most commonly, the anodes or cathodes are interconnected together by providing a lug at an upper corner of the electrode plate, the lugs being interconnected by a busbar or by fusing or welding the lugs together. This interconnection or fusing of the lugs results in connector junctions, which require additional steps in the manufacturing process. In addition, connector junctions may cause local increases in current density in the connector junction, potentially reducing the efficiency of the electrode assembly.

SUMMARY OF THE INVENTION

In one aspect, the present invention is directed to an assembly of monopolar electrodes for use in electrical apparatus. The electrode assembly comprises a pair of electrodes, each of the electrodes having a plurality of spaced apart electrode plates connected together inline. The electrode plates of each of the electrodes are connected to the next electrode plate in the series by a bridging member contiguous with each of the interconnected electrode plates.

In another aspect of the invention, there is provided an electrode for use in an electrode assembly. The electrode comprises a plurality of parallel spaced apart electrode plates connected in series. Each of the electrode plates is connected to the next plate in the series by a bridging strap contiguous with each of the interconnected electrode plates.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
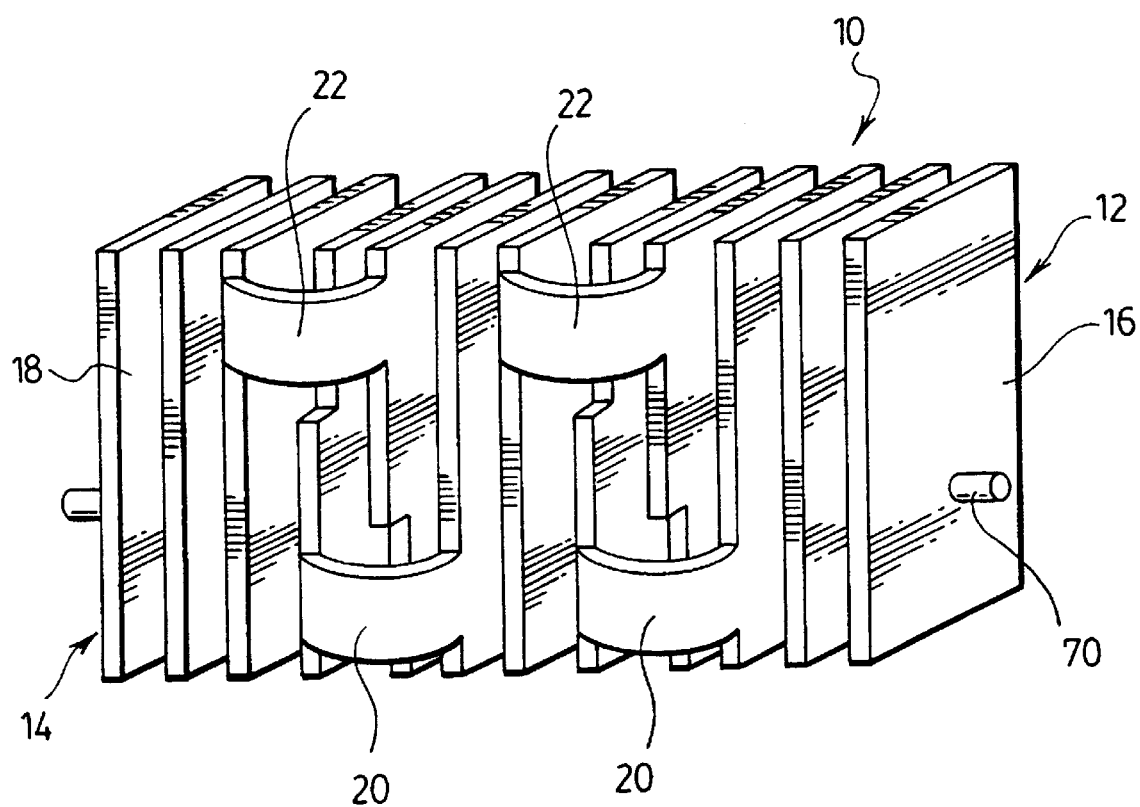
FIG. 1 is a perspective view of an electrode assembly according to the present invention.

A preferred embodiment of an electrode assembly according to the present invention is illustrated in the figures, generally indicated by the numeral 10. Electrode assembly 10 illustrated in the figures is an assembly of two monopolar multi-plate electrodes made up of an anode 12 and a cathode 14. The electrode assembly 10 illustrated in the figures is of particular use in an electrolysis cell for generation of hydrogen gas, although, as explained below, the electrode assembly 10 can be used in other types of electrical apparatuses.

Each of the individual electrodes, anode 12 and cathode 14 are made up of spaced apart inter-connected electrode plates 16 and 18. The electrode plates 16 and 18 of the anode 12 and cathode 14 are interconnected to one another by bridging members 20 and 22 respectively contiguous with and connecting together the individual electrode plates 16. Thus anode plates 16 are interconnected by bridging members 20 at a lower edge of the anode plates 16. Similarly, the individual cathode plates 18 are interconnected by bridging members 22 located at an upper edge thereof.

Figure 2:
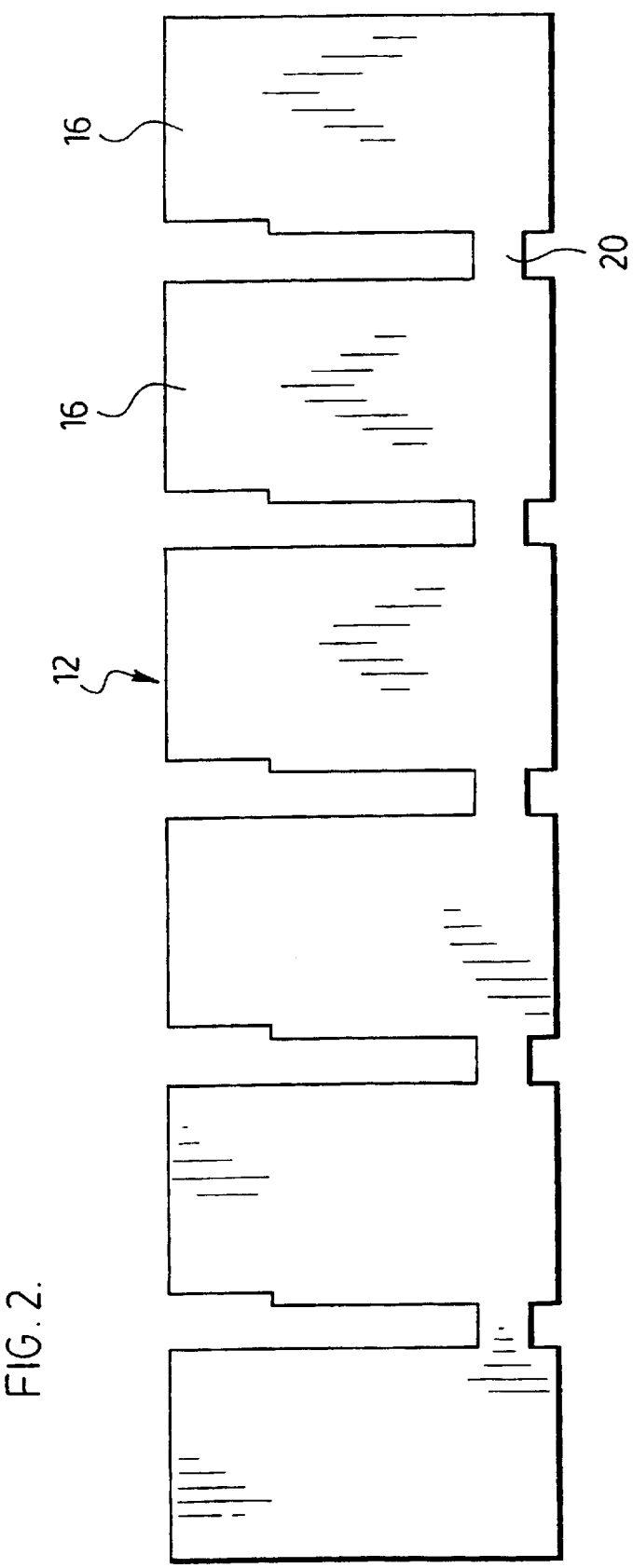
FIG. 2 is a plan view of an electrode for use in the electrode assembly of FIG. 1.

FIG. 2 illustrates a plan view of an individual electrode for use in the electrode assembly 10. The electrode illustrated is an anode 12, however, the cathode 14 is similarly constructed. The individual electrode is formed from a metal blank of a suitable metal material by removing sections of the metal blank to provide for the series of electrode plates 16 interconnected together by the bridging members 20. For use in an electrolysis cell for generation of hydrogen gas, the metal used for construction of the electrodes is preferably a suitable stainless steel, most preferably nickel plated stainless steel. The selection of the suitable metal for use in other applications or other electrical apparatuses would be readily apparent to those skilled in the art.

Once the electrode 12 is formed, it is bent into an accordian shape to provide the parallel spaced apart electrode plates 16 for the individual electrode. As set out in the figures, one of the electrodes has the bridging members 20 located along the edge adjacent the top, while the other electrode has the bridging members 22 located along the edge adjacent the bottom. The two individual electrodes are then interleaved by sliding one electrode into the other with the plates of the first electrode passing between the plates of the second electrode. Once the two electrode plates are interleaved, they may be held in the proper position and spacing by use of a cartridge to hold the electrodes. The cartridge may be provided by using spacer blocks to hold the upper and/or lower ends of the electrode plates in position the spacer blocks being joined to one another by a suitable means such as bolts and nuts. The spacer blocks, bolts and nuts are constructed of a suitable non-conducting material, which is resistant to the physical and chemical environment of the electrical apparatus in which the electrode assembly is to be used. Preferably, for an electrolysis cell, the spacer blocks, bolts and nuts are polypropylene.

Figure 3:
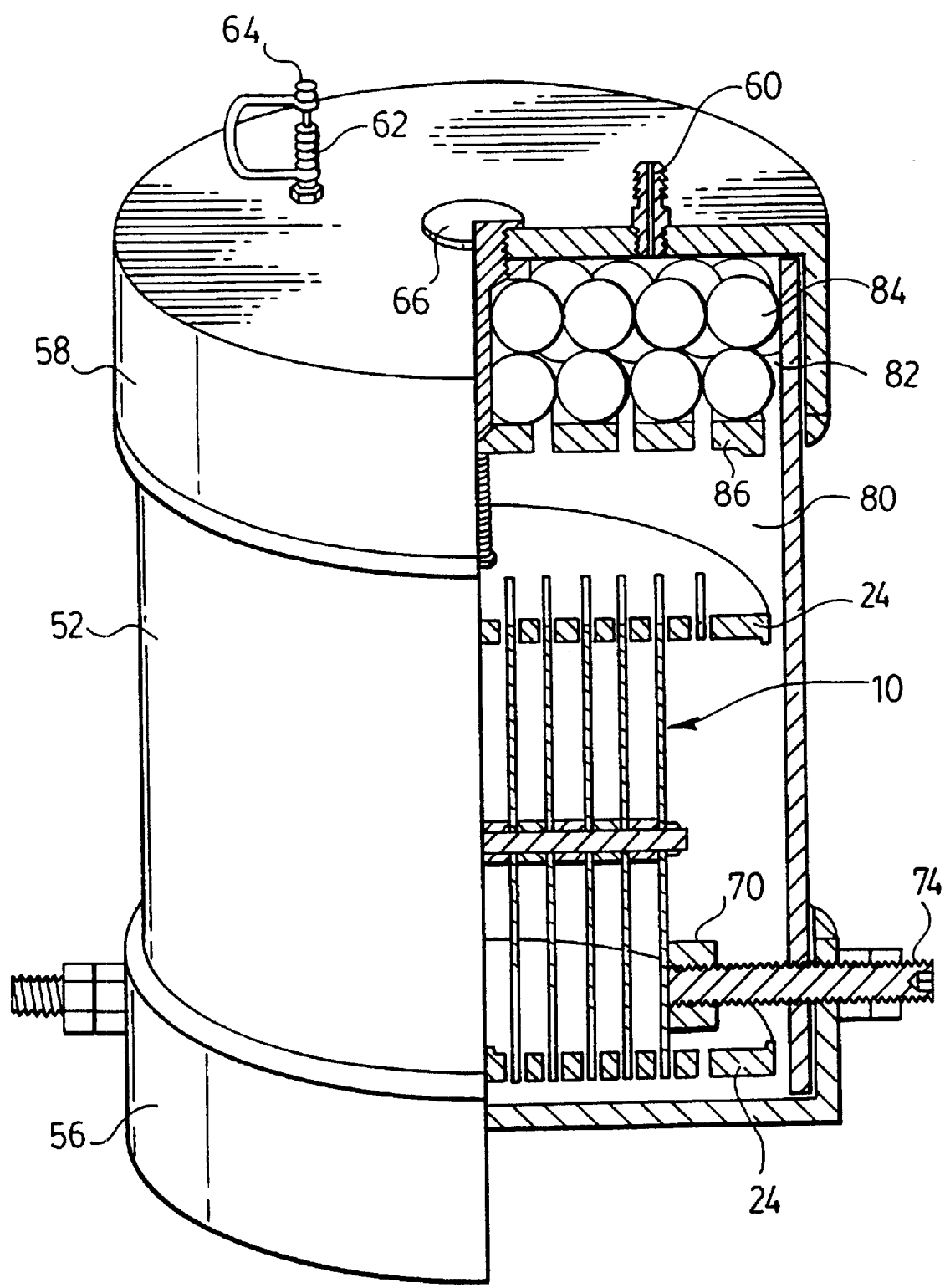
FIG. 3 is a perspective view, partly in cross-section of an electrolysis cell utilizing the electrode assembly of FIG. 1.

The details of an electrochemical cell 50 utilizing an electrode assembly of the present invention are shown in FIG. 3. The electrochemical cell 50 is an electrolysis cell utilized in a hydrogen generating system to generate small quantities of hydrogen and oxygen with the hydrogen and oxygen generated then being combined with the usual air/fuel mixture to improve the efficiency of internal combustion engines. A typical such hydrogen generating system includes the electrolysis cell 50 for generating hydrogen and oxygen gases by electrolysis of an aqueous solution, a power source for providing electrical power to the electrolysis cell, an outlet flow means for introducing the generated gases into the intake manifold system of an internal combustion engine, a monitoring means for monitoring the operating conditions of the hydrogen generating system, and a control means connected to the monitoring means for controlling the operation of the hydrogen generating system in response to the monitoring means. One such hydrogen generating system as described in co-pending Canadian patent application number 2,209,237 includes an electrolysis cell 10 which is used to generate the hydrogen and oxygen gases by electrolysis of a suitable aqueous medium. In the system described, the gases generated by the electrolysis cell are fed through a moisture trap which is connected to the cell by a suitable tubing which is provided with a check valve to prevent the back flow of fluids into the electrolysis cell. The output of the moisture trap is connected to a bubbler by means of a suitable tubing which is also provided with a check valve to prevent back flow of fluids. From the bubbler the gases flow through tubing to a filter to remove any particulate material or residual moisture in the gases. From the filter the gases flow through tubing to a flow control valve which is adjustable to regulate the flow of the gases. The output of the flow control valve is connected to a pump which pumps the gases to a suitable part of the intake system of the engine.

Electrochemical cell 50, preferably has a cylindrical shaped case 52, constructed of a suitable material which would be inert to the electrolyte solution and would not be affected by the voltages or temperatures encountered in the electrolysis cell 50. The case 52 should also preferably have a co-efficient of expansion, which does not cause significant expansion of the dimensions of the cell 50 under the operating conditions of the hydrogen generating system. Preferably, the case 52 of the electrolysis cell 50 is a polyvinyl chloride. While the case 52 may be provided as a one-piece mold, it is preferred that for uniformity, the case 52 be in two sections, the sidewall 54 and the base 56 which are PVC welded to give the characteristics of a one-piece structure.

The electrochemical cell 50 is provided with a welded on cap 58, which represents a gas accumulation zone. The cap 58 is provided with a first opening 60 for an outlet of the electrolysis cell 50 to which tubing for the generated gas is connected. Cap 58 is provided with a second opening 62 for receiving a fill plug 64. Fill plug 64 is utilized to allow the addition of distilled water or electrolyte solution to the cell 50 as the level of fluid in the electrolysis cell 50 decreases. Fill plug 64 may also incorporate a pressure release mechanism to provide for relief of the pressure within the cell 50 should the interior pressure increase beyond a set limit. The fill plug 64 may also function as a rupture plug. In case of malfunction, when internal pressure builds up the plug will be pushed away from its seat, providing an opening for the gasses to be relieved to the atmosphere.

An optical level indicator 81 is assembled to top cap 58 to allow observation when maximum liquid level is reached. This is extremely useful for the fill-up procedure. Optionally the reservoir 80 can be provided with a level sensing means to provide information on actual level of electrolyte, or signalize that a predetermined minimum level has been reached.

The electrolysis cell 50 is provided with an electrode assembly 10 mounted in a cartridge according to the present invention. The cathode and anode electrode plates 16 and 18 are provided with adapters 70 for electrical connection to the positive and negative supply from the motor vehicle electrical system. When the electrode assembly is placed within the case 52, the adapters 70 are aligned with openings 72 in the case 52 for connection of a terminal 74. The portion of the interior of the case 52 where the electrode assembly is located, provides the reservoir chamber for holding of the electrolyte solution and operation of the electrolysis. The above of the reservoir chamber is provided a perforated spacer disc to separate the gas accumulation zone from the reservoir chamber.

The gas accumulation chamber 70 is filled with a multitude of balls 71 made of an inert material, preferably polypropylene. The balls 71 play the role of a mechanical barrier for the gasses exiting the cell 50, removing airborne moisture particles and drying the gasses. Also they act as an anti-splash for the electrolyte and reduce the volume of accumulated gasses limiting the negative repercussions in case of a secondary ignition inside the cell 50.

The electrolyte solution utilized within the electrolysis cell 10, is preferably a basic aqueous solution to provide for increased efficiency of the electrolysis reaction. Preferably, the solution is also adjusted to remain in solution form and not freeze at extremely low temperatures, down to −40° C. or more. Most preferably, the electrolyte solution is a 20 to 30% KOH solution.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An assembly of monopolar electrodes for use in an electrical apparatus, the electrode assembly comprising a first multi-plate electrode interleaved with a second multi-plate electrode, wherein:

each multi-plate electrode includes a discrete series of parallel plates connected together in series by bridging members such that each plate other than the first and last in the series of plates is connected to the plate before it and the plate after it in the series by two discrete bridges, one at each of two opposed edges of the plate;

the plates of the first multi-plate electrode alternate with the plates of the second multi-plate electrode and do not contact the plates of the second multi-plate electrode;

and the bridging members of the first multi-plate electrode do not contact the bridging members of the second multi-plate electrode.

2. The electrode assembly as defined in claim 1, wherein:

each multi-plate electrode is formed from a discrete blank by removal of sections that leave a discrete bridging member between each pair of successive plates in a series of plates and then bending the plates into an accordion shape at the bridging members so that the plates are parallel.

3. The electrode assembly as defined in claim 2, wherein the electrode assembly may be assembled by sliding the first multi-plate electrode into a second multi-plate electrode so that the plates of the first multi-plate electrode alternate with the plates of the second multi-plate electrode.

4. The electrode assembly as defined in claim 3, wherein:
each plate of each multi-plate electrode has a discrete top edge, a discrete bottom edge, and two discrete side edges;
each bridging member of the first multi-plate electrode connects a side edge of one plate of a discrete pair of successive plates of the first multi-plate electrode with a side edge of the other plate of that pair of plates adjacent the top edges of those plates; and
each bridging member of the second multi-plate electrode connects a side edge of one plate of a discrete pair of successive plates of the second multi-plate electrode with a side edge of the other plate of that pair of plates adjacent the bottom edges of those plates.

5. The electrode assembly as defined in claim 2, wherein:
each plate of each multi-plate electrode has a discrete top edge, a discrete bottom edge, and two discrete side edges;
each bridging member of the first multi-plate electrode connects a side edge of one plate of a discrete pair of successive plates of the first multi-plate electrode with a side edge of the other plate of that pair of plates adjacent the top edges of those plates; and
each bridging member of the second multi-plate electrode connects a side edge of one plate of a discrete pair of successive plates of the second multi-plate electrode with a side edge of the other plate of that pair of plates adjacent the bottom edges of those plates.

6. The electrode assembly as defined in claim 1, wherein the electrode assembly is assembled by sliding the first multi-plate electrode into a second multi-plate electrode so that the plates of the first multi-plate electrode alternate with the plates of the second multi-plate electrode.

7. The electrode assembly as defined in claim 6 wherein:
each plate of each multi-plate electrode has a discrete top edge, a discrete bottom edge, and two discrete side edges;
each bridging member of the first multi-plate electrode connects a side edge of one plate of a discrete pair of successive plates of the first multi-plate electrode with a side edge of the other plate of that pair of plates adjacent the top edges of those plates; and
each bridging member of the second multi-plate electrode connects a side edge of one plate of a discrete pair of successive plates of the second multi-plate electrode with a side edge of the other plate of that pair of plates adjacent the bottom edges of those plates.

8. The electrode assembly as defined in claim 1, wherein:
each plate of each multi-plate electrode has a discrete top edge, a discrete bottom edge, and two discrete side edges;
each bridging member of the first multi-plate electrode connects a side edge of one plate of a discrete pair of successive plates of the first multi-plate electrode with a side edge of the other plate of that pair of plates adjacent the top edges of those plates; and
each bridging member of the second multi-plate electrode connects a side edge of one plate of a discrete pair of successive plates of the second multi-plate electrode with a side edge of the other plate of that pair of plates adjacent the bottom edges of those plates.

9. A multi-plate electrode for use as a monopolar electrode in an electrode assembly in an electrical apparatus, the multi-plate electrode comprising a series of parallel plates connected together in series by bridging members such that each plate other than the first and last in the series of plates is connected to the plate before it and the plate after it in the series by two discrete bridges, one at each of two opposed edges of the plate.

10. The multi-plate electrode as defined in claim 9, wherein the multi-plate electrode is formed from a blank by removal of sections that leave a discrete bridging member between each pair of successive plates in a series of plates and then bending the plates into an accordion shape at the bridging members so that the plates are parallel.

11. An electrochemical cell for production of gases by electrolysis the cell comprising an electrode assembly located in a liquid reservoir and an internal gas dryer including a gas accumulation chamber above the liquid reservoir, the gas accumulation chamber filled with a multitude of balls of inert material, the balls providing a mechanical barrier for removing airborne moisture, reducing the volume of accumulated gasses and reducing splashing of liquid.

12. An electrochemical cell as claimed in claim 11, additionally comprising a means for sensing and monitoring liquid levels.

13. An electrochemical cell as defined in claim 12, wherein the electrode assembly comprises:
first multi-plate electrode interleaved with a second multi-plate electrode, wherein:
each multi-plate electrode includes a discrete series of parallel plates connected together in series by bridging members such that each plate other than the first and last in the series of plates is connected to the plate before it and the plate after it in the series by two discrete bridges, one at each of two opposed edges of the plate;
the plates of the first multi-plate electrode alternate with the plates of the second multi-plate electrode and do not contact the plates of the second multi-plate electrode;
and the bridging members of the first multi-plate electrode do not contact the bridging members of the second multi-plate electrode.

14. The electrochemical cell as defined in claim 13, wherein:
each multi-plate electrode is formed from a discrete blank by removal of sections that leave a discrete bridging member between each pair of successive plates in a series of plates and then bending the plates into an accordion shape at the bridging members so that the plates are parallel.

15. The electrode assembly as defined in claim 14, wherein each plate of each multi-plate electrode has a discrete top edge, a discrete bottom edge, and two discrete side edges;
each bridging member of the first multi-plate electrode connects a side edge of one plate of a discrete pair of successive plates of the first multi-plate electrode with a side edge of the other plate of that pair of plates adjacent the top edges of those plates; and
each bridging member of the second multi-plate electrode connects a side edge of one plate of a discrete pair of successive plates of the second multi-plate electrode with a side edge of the other plate of that pair of plates adjacent the bottom edges of those plates,
wherein the electrode assembly may be assembled by sliding the first multi-plate electrode into a second multi-plate electrode so that the plates of the first multi-plate electrode alternate with the plates of the second multi-plate electrode.

16. An electrochemical cell as defined in claim 11, wherein the electrode assembly comprises:

first multi-plate electrode interleaved with a second multi-plate electrode, wherein:

each multi-plate electrode includes a discrete series of parallel plates connected together in series by bridging members such that each plate other than the first and last in the series of plates is connected to the plate before it and the plate after it in the series by two discrete bridges, one at each of two opposed edges of the plate;

the plates of the first multi-plate electrode alternate with the plates of the second multi-plate electrode and do not contact the plates of the second multi-plate electrode;

and the bridging members of the first multi-plate electrode do not contact the bridging members of the second multi-plate electrode.

17. The electrochemical cell as defined in claim 16, wherein:

each multi-plate electrode is formed from a discrete blank by removal of sections that leave a discrete bridging member between each pair of successive plates in a series of plates and then bending the plates into an accordion shape at the bridging members so that the plates are parallel.

18. The electrochemical cell as defined in claim 17, wherein the electrode assembly may be assembled by sliding the first multi-plate electrode into a second multi-plate electrode so that the plates of the first multi-plate electrode alternate with the plates of the second multi-plate electrode.

19. The electrode assembly as defined in claim 18, wherein each plate of each multi-plate electrode has a discrete top edge, a discrete bottom edge, and two discrete side edges;

each bridging member of the first multi-plate electrode connects a side edge of one plate of a discrete pair of successive plates of the first multi-plate electrode with a side edge of the other plate of that pair of plates adjacent the top edges of those plates; and each bridging member of the second multi-plate electrode connects a side edge of one plate of a discrete pair of successive plates of the second multi-plate electrode with a side edge of the other plate of that pair of plates adjacent the bottom edges of those plates.

* * * * *